Patented Feb. 26, 1957

2,783,158

PRODUCTION OF COLOURED FILAMENTS, FIBRES, THREADS, AND THE LIKE

Donald Entwistle and Stewart Robertson, Coventry, England, assignors to Courtaulds Limited, London, England, a British company No Drawing. Application November 25, 1952, Serial No. 322,554

Claims priority, application Great Britain December 28, 1951

5 Claims. (Cl. 106—165)

This invention relates to the production of coloured filaments, fibres, threads and the like, hereinafter referred to as "threads," by a process in which viscose containing a colouring matter is extruded into a coagulating bath.

A convenient method of adding the colouring matter to the viscose is described in United States patent specification No. 1,823,769 in which the colouring matter is mixed with a small quantity of the viscose so as to make a solution or suspension of the colouring matter in the viscose and the mixture is then added to the main body of the viscose by an injecting machine. Owing to the ageing of the viscose only a small quantity of the viscose to be injected is prepared at a time and in order to obtain a uniform product the margin of error permissible in the preparation of such a small quantity is small.

The object of the present invention is to provide a non-ageing medium for the colouring matter for injection into viscose.

According to the present invention a process for the production of coloured viscose rayon threads comprises dispersing a water-insoluble colouring matter in a non-ageing viscous solution of a material compatible with viscose, adding the mixture obtained to viscose and extruding the viscose into a coagulating bath.

Examples of materials which form a non-ageing viscous solution which is compatible with viscose which may be used to carry out the process of the present invention are casein and sodium carboxymethyl cellulose which latter may be prepared by reacting cellulose in presence of alkali with monochlor-acetic acid. Casein may be dissolved in caustic soda solution and sodium carboxymethyl cellulose may be dissolved in water or caustic soda solution. The non-ageing viscous solution is preferably fibre-forming and should be capable of being spun on viscose spinning machinery, in particular it must have the property of being metered by gear wheel pumps.

The colouring matter used must be water-insoluble and resistant to the alkali of the viscose, the acid of the coagulating bath and the desulphurising agent used to treat the threads after their formation. Examples of suitable materials are certain vat dyestuffs in the unreduced state, azoic dyestuffs and coloured mineral pigments such as burnt chromium oxide (colour index No. 1291). The term "colouring matter" includes white and black colouring matters, for example titanium dioxide and carbon black.

The solution of the material compatible with viscose preferably has substantially the same viscosity as that of the viscose to which it is to be added. When the solution to be added to the viscose contains caustic soda it is not essential for the caustic soda concentration of the mixture to be the same as the caustic soda concentration of the viscose.

The non-ageing viscous solution should be capable of holding the colouring matter dispersed in it as a uniform suspension for long periods so that a large quantity of the solution can be made up with a particular pigment for use over a long period for addition to viscose to give threads of uniform colouration. The preparation of a large quantity of the colouring matter in a non-ageing medium involves only one weighing of a comparatively large quantity of pigment whereas the use of viscose itself to carry the pigment into the viscose necessitates the making-up of small batches, thereby involving numerous separate weighings of small quantities of pigment which may involve errors and give rise to substantial differences in colour of the threads prepared from different batches. The present invention therefore enables threads of more uniform colour to be obtained.

The mixture of the colouring matter and the solution of the material compatible with viscose is preferably injected into the viscose which is then spun in the normal manner and subjected to the usual after-treatments. The material will be coagulated with the viscose in the coagulating bath and some of the material may be retained in the threads. Since the viscose and non-ageing viscous solution are compatible, threads of uniform colouration are obtained. If the viscose and non-ageing viscous solution were incompatible, threads exhibiting speckled effects would be obtained with some of the pigment particles suspended in the cellulose from the viscose constituent of the spinning solution and the remainder of the pigment particles suspended in the material from the other constituent.

By the process of the present invention it is possible to prepare a large quantity of the mixture to be added to the viscose since the solution of the material can be preserved substantially unchanged for a period of at least a month.

The invention also includes coloured viscose rayon threads produced by the process of the present invention.

The invention is illustrated by the following examples in which the percentages are by weight:

*Example 1*

A solution containing 10 percent of sodium carboxymethyl cellulose and 4 percent of caustic soda was prepared by dissolving sodium carboxymethyl cellulose having 0.45 carboxymethyl group per anhydroglucose unit of cellulose in caustic soda solution in a paddle mixer for 4 hours at a temperature between 20° and 30° centigrade. The solution was filtered through layers of textile fabric in a filter press until the solution had substantially the same filtration characteristics as those of a viscose suitable for spinning. The stock solution obtained had a viscosity of 60 poises and could be preserved substantially unchanged for a period of time of at least one month.

A mixture for adding to viscose was prepared by mixing together in a paddle mixer for 30 minutes 63.75 kg. of the stock solution prepared above, 34.65 kg. of Monolite Red 4 RHVS paste containing 12.5 percent of solid pigment and 1.6 kg. of a highly sulphonated castor oil. The mixture was filtered through layers of textile fabric in a filter press, stored under vacuum for 6 hours and was then ready for spinning. The mixture was injected into a main viscose supply line at an injection ratio in parts by weight of 1:60. The viscose containing the mixture was extruded into an acid coagulating bath and the threads obtained had a uniform red colouration.

*Example 2*

A mixture for adding to viscose was prepared by mixing together in a paddle mixer 12.2 kg. of the stock solution of sodium carboxymethyl cellulose as described in Example 1, 0.56 kg. of a chromium oxide paste (colour index No. 1291) containing 24.4 percent of solid pigment, 2.10 kg. of 22 percent caustic soda solution and 0.14 kg.

of a highly sulphonated castor oil. The mixture was filtered, stored under vacuum and was then injected into a main viscose supply line at an injection ratio in parts by weight of 1:20. The viscose was extruded into an acid coagulating bath and the threads obtained had a pleasant green colour.

*Example 3*

A mixture for adding to viscose was prepared by mixing together in a paddle mixer for 30 minutes, 7.6 kg. of a 17.5 percent casein solution in dilute caustic soda, 2.3 kg. of Monolite Red 4 RHVS paste containing 12.5 percent of solid pigment and 0.1 kg. of a highly sulphonated castor oil. The mixture was filtered, stored under vacuum and was then injected into a main viscose supply pipe at an injection ratio in parts by weight of 1:40. The viscose was extruded into an acid coagulating bath and the threads obtained had a uniform red colouration.

What we claim is:

1. A process for the production of colored viscose rayon threads comprising forming a viscose solution, forming a viscous aqueous solution ageing said viscose solution to render it suitable for spinning of sodium carboxy methyl cellulose, dispersing a water-insoluble coloring matter in said viscous solution, injecting said viscous solution containing the coloring matter into the aged viscose just prior to spinning and extruding the mixture of viscose and viscous solution into a coagulating bath.

2. A process as claimed in claim 1 wherein the viscous solution of sodium carboxy methyl cellulose has substantially the same viscosity as the aged viscose.

3. A process as claimed in claim 1 wherein the injection ratio of viscous solution to aged viscose is from 1:20 to 1:60.

4. A spinning solution for the production of viscose rayon threads comprising a mixture of an aged viscose solution, a viscous aqueous solution of sodium carboxy methyl cellulose, and a water insoluble coloring matter.

5. A spinning solution as claimed in claim 4 wherein the ratio of aged viscose solution to viscous solution of sodium carboxy methyl cellulose is from 20:1 to 60:1.

References Cited in the file of this patent

UNITED STATES PATENTS

| | | |
|---|---|---|
| 1,984,303 | Hardt | Dec. 11, 1934 |
| 2,039,708 | Crouch et al. | May 5, 1936 |
| 2,136,201 | Whitehead | Nov. 8, 1938 |
| 2,690,398 | Guertler et al. | Sept. 28, 1954 |
| 2,706,689 | Agulhon | Apr. 19, 1955 |

FOREIGN PATENTS

| | | |
|---|---|---|
| 231,808 | Great Britain | Nov. 30, 1925 |
| 503,349 | Great Britain | Apr. 5, 1939 | ly
UNITED STATES PATENT OFFICE
CERTIFICATE OF CORRECTION

Patent No. 2,783,158            February 26, 1957

Donald Entwistle et al.

It is hereby certified that error appears in the above numbered patent requiring correction and that the said Letters Patent should read as corrected below.

Column 3, lines 22 and 23, strike out "ageing said viscose solution to render it suitable for spinning" and insert the same after "solution," in line 21, same column 3.

Signed and sealed this 11th day of September 1962.

(SEAL)
Attest:

ERNEST W. SWIDER            DAVID L. LADD
Attesting Officer            Commissioner of Patents